United States Patent
Sherman

(10) Patent No.: US 12,241,214 B2
(45) Date of Patent: Mar. 4, 2025

(54) WHEELED SNOW SCOOP

(71) Applicant: Andrew Gene Sherman, Bozeman, MT (US)

(72) Inventor: Andrew Gene Sherman, Bozeman, MT (US)

(73) Assignee: Andrew G. Sherman, Bozeman, MT (US)

( * ) Notice: Subject to any disclaimer, the term of this patent is extended or adjusted under 35 U.S.C. 154(b) by 638 days.

(21) Appl. No.: 17/674,178

(22) Filed: Feb. 17, 2022

(65) Prior Publication Data

US 2023/0257949 A1     Aug. 17, 2023

(51) Int. Cl.
  *E01H 5/02*   (2006.01)
  *B62B 3/08*   (2006.01)
  *E01H 5/06*   (2006.01)

(52) U.S. Cl.
  CPC .............. *E01H 5/065* (2013.01); *B62B 3/08* (2013.01); *E01H 5/02* (2013.01)

(58) Field of Classification Search
  CPC .. E01H 5/02; E01H 5/065; B62B 1/00; B62B 1/147; B62B 1/24; B62B 1/16; B62B 1/02; B62B 1/06
  See application file for complete search history.

(56) References Cited

U.S. PATENT DOCUMENTS

| | | | | | |
|---|---|---|---|---|---|
| 611,613 | A | * | 10/1898 | Doty et al. | B62B 1/24 |
| | | | | | 298/2 |
| 887,874 | A | * | 5/1908 | Toy | B62B 1/147 |
| | | | | | 37/434 |
| 1,006,985 | A | * | 10/1911 | Smith | B62B 1/24 |
| | | | | | 37/434 |
| 1,473,572 | A | * | 11/1923 | Fitzgerald | E01H 5/02 |
| | | | | | 294/59 |
| 1,683,732 | A | * | 9/1928 | Selin | E01H 5/02 |
| | | | | | 294/59 |
| 1,755,652 | A | * | 4/1930 | Kinsley | E01H 5/02 |
| | | | | | 37/265 |
| 1,956,295 | A | * | 4/1934 | Lindgren | E01H 5/02 |
| | | | | | 37/284 |
| 2,338,645 | A | * | 1/1944 | James | B62B 1/02 |
| | | | | | 108/55.1 |
| 2,693,389 | A | * | 11/1954 | Maxwell | B62B 1/24 |
| | | | | | 298/2 |
| 2,852,872 | A | * | 9/1958 | Benz | B62B 1/147 |
| | | | | | 294/59 |

(Continued)

*Primary Examiner* — Jamie L McGowan

(57) ABSTRACT

A wheeled shoveling device which allows the user to scoop up snow, lift the load using the natural weight of the user as a counter-balance, and transport the load to a location whereby it can be frontally discharged using a hand-powered pulling motion on an attached jointed lever. The scoop is attached using a bushing-style hinge, to a large inverted A-shaped frame, allowing the scoop to pivot forward after application of the jointed lever, effectively discharging the scoop. The inverted "A" frame has an axle and pair of wheels which act as both a fulcrum, as well as a means for transporting the load to another location with the load being held above the ground. The scoop has a pair of small protruding wheels attached to the sides of the scoop box, preventing the scoop's leading edge blade from jamming against terrestrial surface imperfections.

1 Claim, 3 Drawing Sheets

(56) References Cited

U.S. PATENT DOCUMENTS

| | | | | | |
|---|---|---|---|---|---|
| 2,974,428 | A | * | 3/1961 | Krasner | E01H 5/02 37/282 |
| 3,028,695 | A | * | 4/1962 | Westby | E01H 5/02 294/181 |
| 3,043,033 | A | * | 7/1962 | Odell | E01H 5/02 298/5 |
| 3,121,963 | A | * | 2/1964 | Nolan | E01H 5/02 298/28 |
| 3,343,807 | A | * | 9/1967 | Moraski | A01B 1/028 294/59 |
| 3,469,326 | A | * | 9/1969 | Malickson | E01H 5/02 254/131.5 |
| 3,486,252 | A | * | 12/1969 | Daniels | E01H 5/02 37/270 |
| 3,594,932 | A | * | 7/1971 | Eriksson | B62B 1/147 280/47.21 |
| 3,833,262 | A | * | 9/1974 | Tasse | B62B 1/24 298/3 |
| 4,161,073 | A | * | 7/1979 | Oakes | E01H 5/02 280/47.24 |
| 4,302,894 | A | * | 12/1981 | Emma | B62B 1/147 37/434 |
| 4,735,424 | A | * | 4/1988 | Stelter, III | B62B 1/147 280/43.11 |
| 4,910,893 | A | * | 3/1990 | Asay | A01K 1/10 37/285 |
| 5,018,282 | A | * | 5/1991 | Hong | E02F 3/02 37/434 |
| 5,048,206 | A | * | 9/1991 | Jones | B62B 1/147 37/434 |
| 5,511,327 | A | * | 4/1996 | Jurkowski | E01H 5/02 37/285 |
| 5,581,915 | A | * | 12/1996 | Lobato | E01H 5/02 280/47.38 |
| 5,593,271 | A | * | 1/1997 | Hall | B62B 1/147 414/490 |
| 5,669,163 | A | * | 9/1997 | Winter | E01H 5/02 37/284 |
| 6,193,319 | B1 | * | 2/2001 | Kielinski | B62B 1/16 298/17 B |
| 6,219,944 | B1 | * | 4/2001 | Byers | E02F 3/02 37/285 |
| 6,735,887 | B1 | * | 5/2004 | Muzzammel | E01H 5/02 37/285 |
| 6,948,268 | B1 | * | 9/2005 | Ronca | E01H 5/02 37/284 |
| 8,166,677 | B1 | * | 5/2012 | Woyak | E01H 5/02 37/285 |
| 9,187,872 | B1 | * | 11/2015 | Hermanson | E01H 5/02 |
| 9,238,894 | B1 | * | 1/2016 | Campos | E01H 5/02 |
| 9,366,003 | B1 | * | 6/2016 | Stenzel | E02F 3/02 |
| 9,945,085 | B1 | * | 4/2018 | Stenzel | E01H 5/02 |
| 10,724,194 | B1 | * | 7/2020 | Hogan | E01H 5/02 |
| 11,346,073 | B2 | * | 5/2022 | Huffman | B62B 1/147 |
| 2004/0003518 | A1 | * | 1/2004 | Hamilton | E01H 5/02 37/265 |
| 2004/0189029 | A1 | * | 9/2004 | Harrison | E01H 5/02 294/54.5 |
| 2005/0160632 | A1 | * | 7/2005 | Williams | B62B 1/147 37/265 |
| 2006/0022474 | A1 | * | 2/2006 | Lachance | E01H 5/02 294/54.5 |
| 2007/0113430 | A1 | * | 5/2007 | Chang | E01H 5/02 37/265 |
| 2009/0108602 | A1 | * | 4/2009 | Strenzel | E01H 5/02 294/54.5 |
| 2010/0175284 | A1 | * | 7/2010 | Chang | E01H 5/02 37/434 |
| 2012/0319369 | A1 | * | 12/2012 | Miller | E01H 5/02 280/47.24 |
| 2015/0027008 | A1 | * | 1/2015 | Barron | E01H 5/02 37/197 |
| 2017/0226710 | A1 | * | 8/2017 | Al Adawi | E01H 5/02 |
| 2019/0194891 | A1 | * | 6/2019 | Chun | A01B 1/02 |
| 2021/0032826 | A1 | * | 2/2021 | Aguilar | E01H 5/02 |
| 2021/0219480 | A1 | * | 7/2021 | Dombrowski | E01H 5/02 |
| 2022/0142032 | A1 | * | 5/2022 | Worthy | A01B 1/028 |
| 2023/0257949 | A1 | * | 8/2023 | Sherman | E01H 5/065 37/265 |

* cited by examiner

WHEELED SNOW SCOOP

FIELD OF THE INVENTION

The Wheeled Snow Scoop of the present invention is designed to scoop up snow or other granular material, and with minimal effort using the natural body weight of the operator as a counter balance to the load, lift the granular load and allow the transport of the contents of the scoop to another location, where the contents can be released using a centrally mounted jointed lever that is attached to both the back of the scoop box and the underlying wheeled frame.

The scoop is boxed in at the sides and back and has a removable/replaceable steel blade bolted to its leading edge. The scoop box has two small wheels attached to the sides of the scoop box at each end of the leading edge that protrude frontally, thereby allowing the scoop to ride up and over imperfections found in sidewalks, driveways, or other irregularities found on the ground. The scoop is attached to the frame using a bushing style hinge which is attached to the underside of the leading edge of the scoop box and also to the front of the wheeled frame, thereby allowing the scoop to pivot forward once the lever is actuated.

The frame of the wheeled scoop is an inverted "A-shaped" design with the apex of the "A" serving as a mount for an axle and two wheels. This wheel and axle apparatus serves as both a means for mobility for the scoop and frame, as well as a fulcrum about which the entire apparatus can pivot, allowing the operator to balance the granular load with their natural body weight during lifting and transport.

The centrally mounted jointed lever allows the scoop to be emptied using minimal effort. The joint in the lever allows for a directional change in input force, so that the load is discharged forward as the lever is pulled backward. The central mount location of the lever allows the lever to be operated easily by both right and left-handed operators.

DESCRIPTION OF THE PRIOR ART

The use of snow removal devices is known in the prior art. Specifically, snow removing devices are known to consist basically of familiar and obvious structural configurations developed to fulfill countless objectives and requirements in snow removal.

By way of example, the prior art discloses in:

U.S. Pat. No. 5,511,327 to Marlin G. Jurkowski: Kevin S. Jurkowski a wheeled snow shoveling device.

U.S. Pat. No. 5,048,206 to Jones discloses a combined snow shoveling device and cart.

U.S. Pat. No. 3,469,326 to Malickson discloses a snow shoveling apparatus.

The Wheeled Snow Scoop according to the present invention substantially departs from the conventional designs and concepts of the prior art, and in so doing, provides an apparatus for the purpose of removing snow or other granular materials with minimal effort by scooping the snow or granular material into a boxed scoop, counterbalancing the weight of the scooped material using the natural body weight of the user, and allowing transport of the material to a desired location making use of the wheeled frame, where it can be discharged with minimal effort via the use of a jointed lever. In this regard, the present invention substantially fulfills this purpose.

SUMMARY OF THE INVENTION

The Wheeled Snow Scoop of the present invention is designed to scoop up snow or other granular material, and with minimal effort using the natural body weight of the operator as a counter balance to the load, lift the granular load and allow the transport of the contents of the scoop to another location, where the contents can be released using a hand-operated, centrally mounted, jointed lever that is attached to both the back of the scoop box and the underlying wheeled frame.

The scoop is boxed in at the sides and back and has a removable/replaceable steel blade bolted to its leading edge. The scoop box has two small wheels attached to the sides of the scoop box at each end of the leading edge that protrude frontally, thereby allowing the scoop to ride up and over imperfections found in sidewalks, driveways, or other irregularities found on the ground. The scoop is attached to the frame using a bushing style hinge which is attached to the underside of the leading edge of the scoop box and also to the front of the wheeled frame, thereby allowing the scoop to pivot forward once the lever is actuated.

The frame of the wheeled scoop is an inverted "A-shaped" design with the apex of the "A" serving as a mount for an axle and two wheels. This wheel and axle apparatus serves as both a means for mobility for the scoop and frame, as well as a fulcrum about which the entire apparatus can pivot, allowing the operator to balance the granular load with their natural body weight during lifting and transport.

The centrally mounted jointed lever allows the scoop to be emptied using minimal effort. The joint in the lever allows for a directional change in input force, so that the load is discharged forward as the lever is pulled backward. The central mount location of the lever allows the lever to be operated easily by both right and left-handed operators.

BRIEF DESCRIPTION OF THE DRAWINGS

The same reference numerals refer to the same parts in all figures.

DETAILED DESCRIPTION OF THE PREFERRED EMBODIMENT

Figure 1:
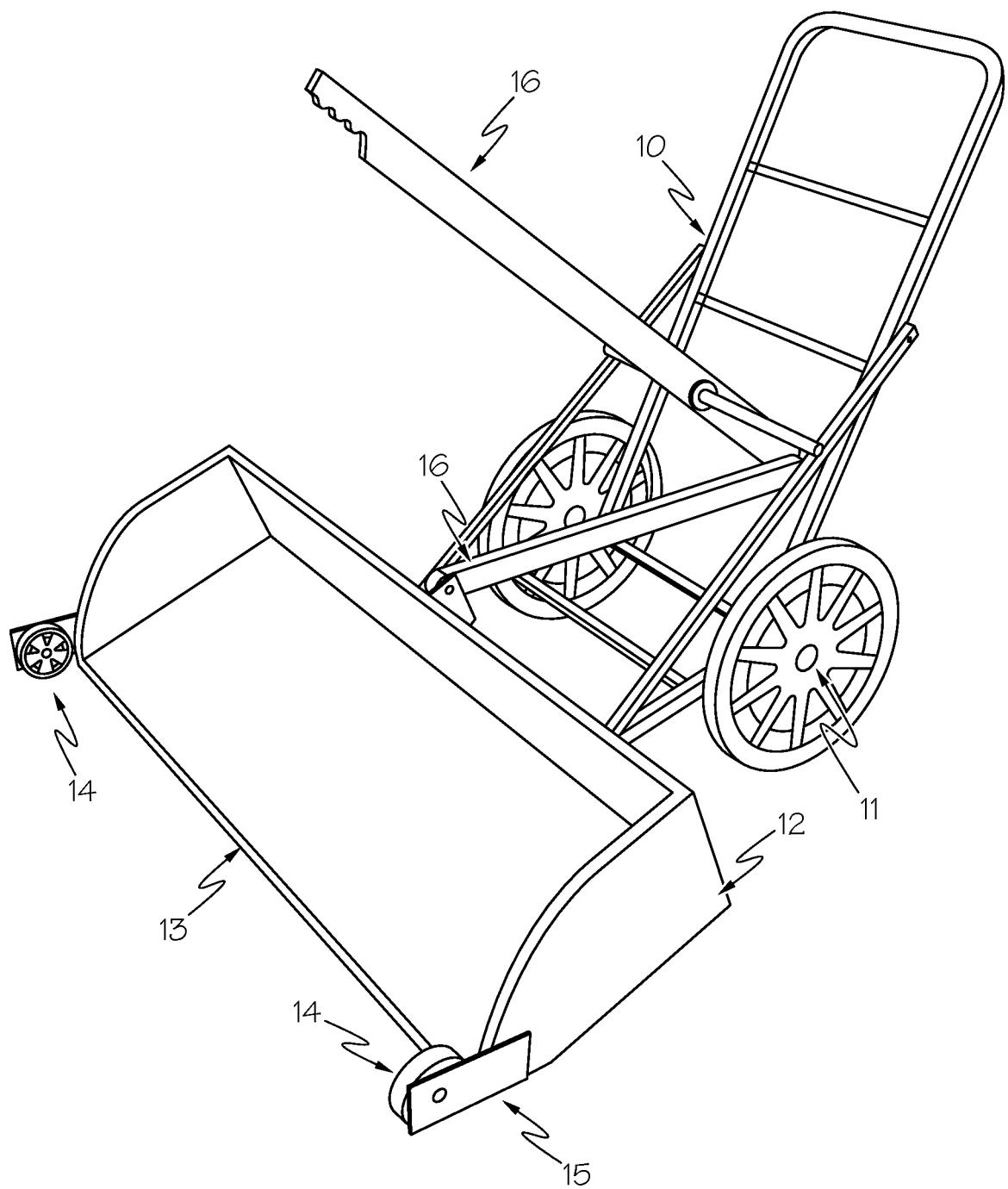
FIG. 1 is a perspective illustration of the wheeled snow scoop according to the present invention.
Figure 2:
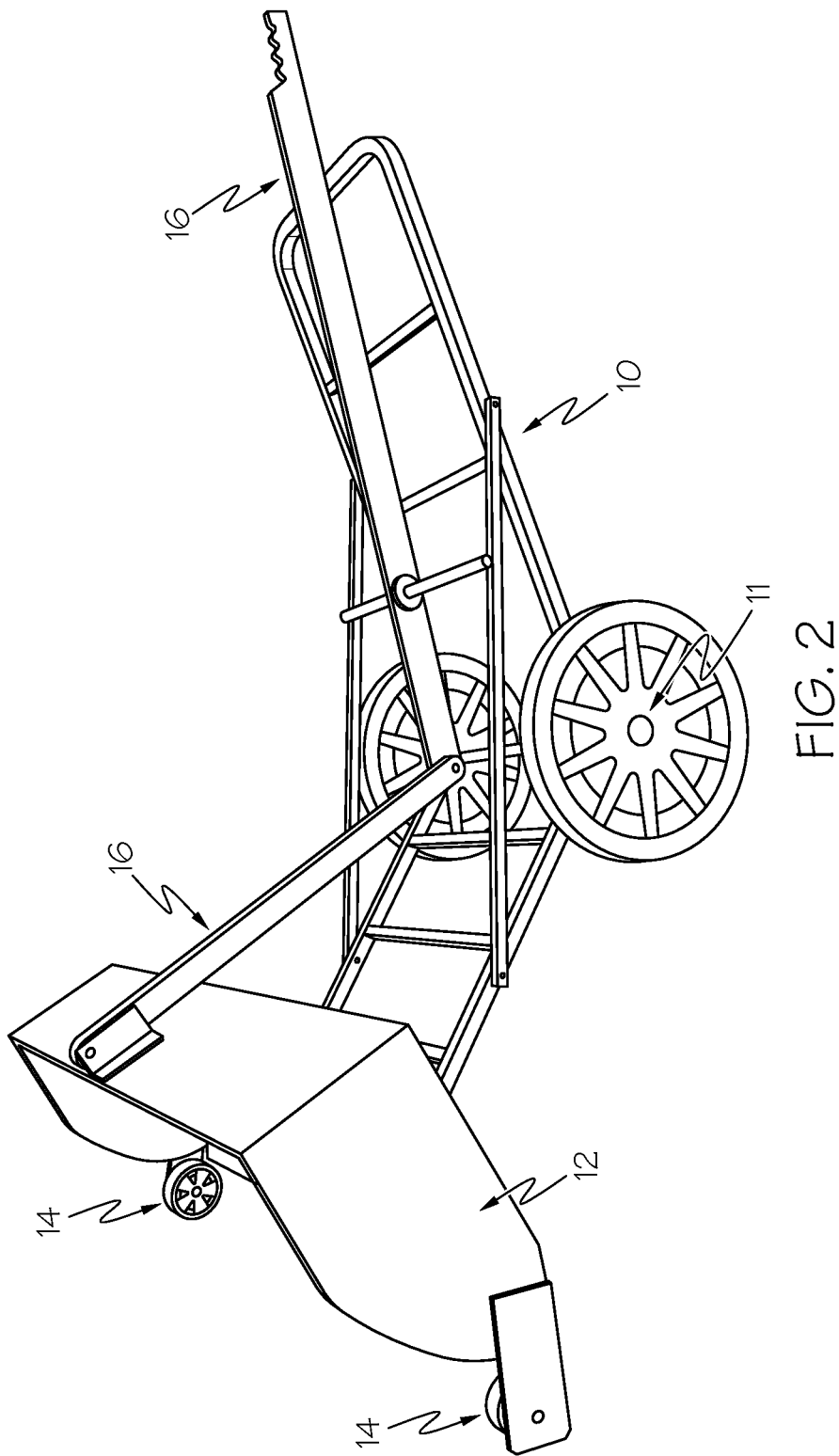
FIG. 2 is a side view of the present invention illustrating the pivoting nature of the frame about the wheel and axle, and the actuation of the jointed lever with the scoop in its released position.
Figure 3:
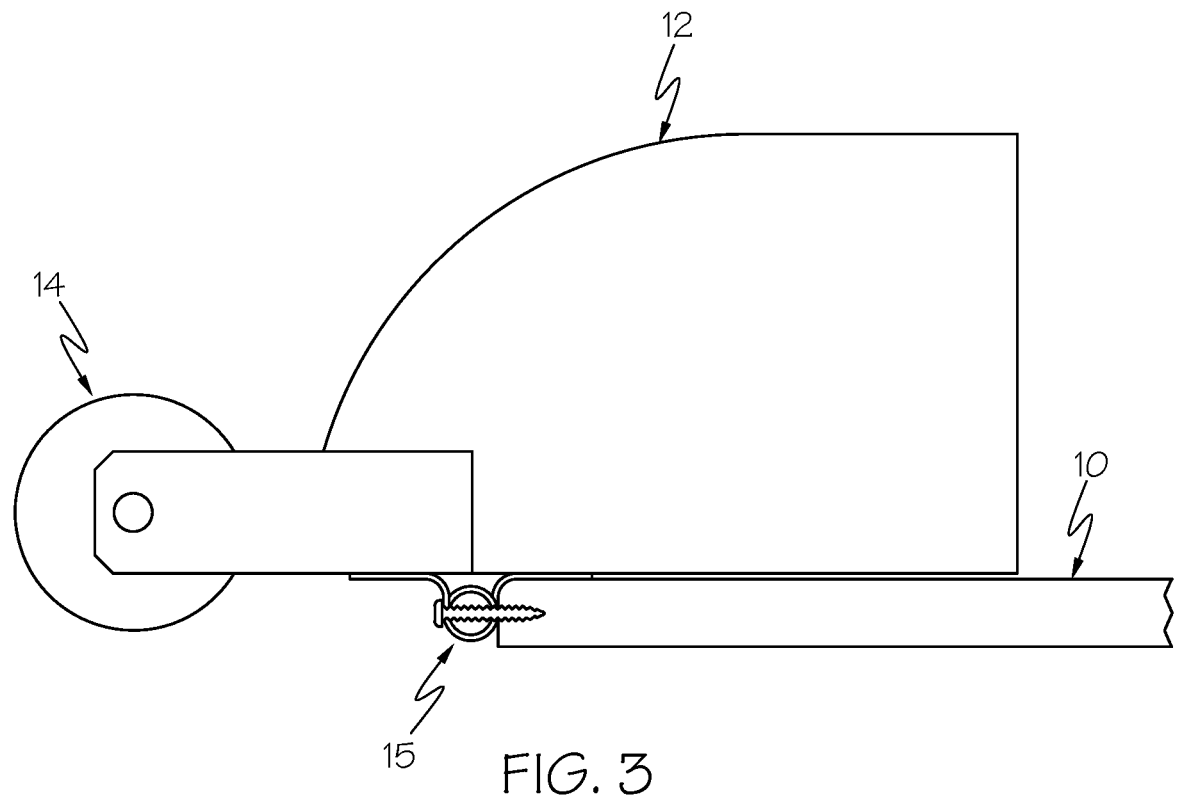
FIG. 3 is a closer side view of the snow scoop box illustrating the undermount hinge bushing as well as the protruding leading edge wheels.

The present invention is a Wheeled Snow Scoop designated generally as FIGS. 1, 2, and 3 in the drawings. As shown in FIGS. 1 and 2, Wheeled Snow Scoop includes an inverted "A" shaped tubular steel frame with numerous cross bars for strength 10, an assembly consisting of two wheels connected by a transverse axle at the apex of the frame for lifting and transport 11, a scoop box with a flat bottom, sides and a back 12, a replaceable steel edge attached to the leading edge of the scoop box bottom for scraping snow or other granular materials from the ground 13, two leading edge wheels mounted to the sides of the scoop box that both support the scoop box as it is being filled with material, and allow the scoop box to travel smoothly over uneven ground without jamming the edge against imperfections 14, a leading edge bushing style hinge mounted to the bottom of the scoop box and the front of the tubular frame, allowing the scoop to pivot off of the frame in a forward direction 15, and a jointed lever assembly that allows the scoop to be tipped forward as the lever is pulled backward 16, effectively discharging the scoop's load once a desired location is reached by the operator.

FIG. 2 is a perspective view of the present Wheeled Snow Scoop invention illustrating the invention with its lever actuated, and the scoop box in the discharged/emptied position.

FIG. 3 is a side view of the scoop portion of the present invention 12, illustrating the leading edge wheels 14, the bushing style hinge mount 15, whereby the scoop box is attached to the front of the frame 10, allowing the scoop to pivot forward upon activation of the scoop box lever.

What I claim is:

1. A wheeled snow scoop, frame, and lever for manually scooping snow or other granular materials comprising:
    a scoop box receptacle having a flat bottom, flat sides, a flat back and an open front;
    a metal blade attached to a leading edge of said scoop box bottom to scrape surfaces allowing granular materials to enter said scoop box;
    a pair of bushing style hinges with a center pole (bushing) that allows said scoop box to pivot at its leading edge;
    a pair of wheels attached to the external sides of said scoop box and protruding forward from the leading edge of said scoop box to prevent said leading edge metal blade from catching on surface imperfections; and
    a frame attached to an underside of the leading edge of said scoop box to transfer an input force of a user of said snow scoop, further comprising:
    a tubular steel inverted "A-shaped" frame with seven transverse members mounted between the inverted "A-shaped" sides of said frame with the first transverse member being an input handle, the fourth transverse member being an axle, and the seventh transverse member being an attachment point for the leading edge of said scoop box via said bushing center pole;
    a pair of tubular supports forming stabilizing cross-members for the inverted A-shape of said frame, spanning said side frame members forming the legs of the "A" and attached to said frame with cotter key fittings for easy removal and dismantling;
    a pair of wheels attached externally to the apex of the "A" shaped vertex of said frame, and to the ends of said fourth transverse (axle) member; and
    a single-jointed lever with a lower arm of said lever being attached to the flat back of said scoop box at a mounted pivot pin and bracket; an upper arm of said lever has an axle style pivot point using a tubular steel transverse member that passes through said upper arm and spans said stabilizing cross-members of the inverted A-shaped frame.

* * * * *